United States Patent
Suresh et al.

(10) Patent No.: US 7,631,492 B2
(45) Date of Patent: Dec. 15, 2009

(54) SYSTEM AND METHOD FOR INHIBITING UNCONTROLLED REGENERATION OF A PARTICULATE FILTER FOR AN INTERNAL COMBUSTION ENGINE

(76) Inventors: Arvind S. Suresh, 3232 N. Country Brook St., Columbus, IN (US) 47201; Neal W. Currier, 1702 N. Ridgewood Dr., Columbus, IN (US) 47203; Aleksey Yezerets, 231 N. Oakbrook Dr., Columbus, IN (US) 47201; Bradlee J. Strolia, 3715 River Rd., Columbus, IN (US) 47203

( * ) Notice: Subject to any disclaimer, the term of this patent is extended or adjusted under 35 U.S.C. 154(b) by 254 days.

(21) Appl. No.: 11/613,729

(22) Filed: Dec. 20, 2006

(65) Prior Publication Data
US 2008/0173010 A1    Jul. 24, 2008

(51) Int. Cl.
*F01N 3/00* (2006.01)
(52) U.S. Cl. .............................. 60/295; 60/274; 60/278; 60/285; 60/297; 60/303; 123/90.15; 123/568.11
(58) Field of Classification Search .................... 60/274, 60/276, 278, 280, 285, 286, 287, 292, 295, 60/297, 303, 311; 123/90.15, 568.11, 689
See application file for complete search history.

(56) References Cited

U.S. PATENT DOCUMENTS

| | | | |
|---|---|---|---|
| 5,489,319 | A | 2/1996 | Tokuda et al. |
| 6,235,254 | B1 | 5/2001 | Murphy et al. |
| 6,253,543 | B1 | 7/2001 | Russell |
| 6,543,218 | B2 | 4/2003 | Ketcher |
| 6,574,956 | B1 | 6/2003 | Moraal et al. |
| 6,644,023 | B2 * | 11/2003 | Hirota et al. ............ 60/297 |
| 6,681,565 | B2 | 1/2004 | Russell |
| 6,823,665 | B2 | 11/2004 | Hirota et al. |
| 6,851,258 | B2 * | 2/2005 | Kawashima et al. ........ 60/311 |
| 6,957,642 | B2 * | 10/2005 | Miura ..................... 123/399 |
| 7,021,050 | B2 | 4/2006 | Nishimura et al. |
| 7,134,275 | B2 | 11/2006 | Tsutsumoto et al. |

(Continued)

FOREIGN PATENT DOCUMENTS

EP      0952323      10/1999

OTHER PUBLICATIONS

PCT International Search Report and Written Opinion dated Sep. 12, 2008 relating to PCT/US07/87761.

*Primary Examiner*—Binh Q. Tran
(74) *Attorney, Agent, or Firm*—Barnes & Thornburg LLP; J. Bruce Schelkopf, Esq.

(57) ABSTRACT

Inhibiting uncontrolled regeneration of a particulate filter fluidly coupled to an exhaust manifold of an internal combustion engine may comprise reducing an oxygen concentration of exhaust gas supplied to the particulate filter if active regeneration of the particulate filter is in progress and rotational speed of the engine speed thereafter drops to an idle speed range from an elevated rotational speed that is greater than the idle speed range. Reducing the oxygen concentration of the exhaust gas supplied to the particulate filter may include any one or combination of reducing the oxygen concentration of intake air supplied to the intake manifold, reducing the air portion of the air-to-fuel ratio of the air-fuel mixture supplied to the engine and removing oxygen from the exhaust gas supplied to the particulate filter.

22 Claims, 5 Drawing Sheets

U.S. PATENT DOCUMENTS 7,200,991 B2  4/2007  Otake et al.
7,275,365 B2 * 10/2007  Zhan et al. .................... 60/295
7,310,941 B2  12/2007  Kuboshima et al.
7,316,107 B2  1/2008  Aratsuka et al.

* cited by examiner

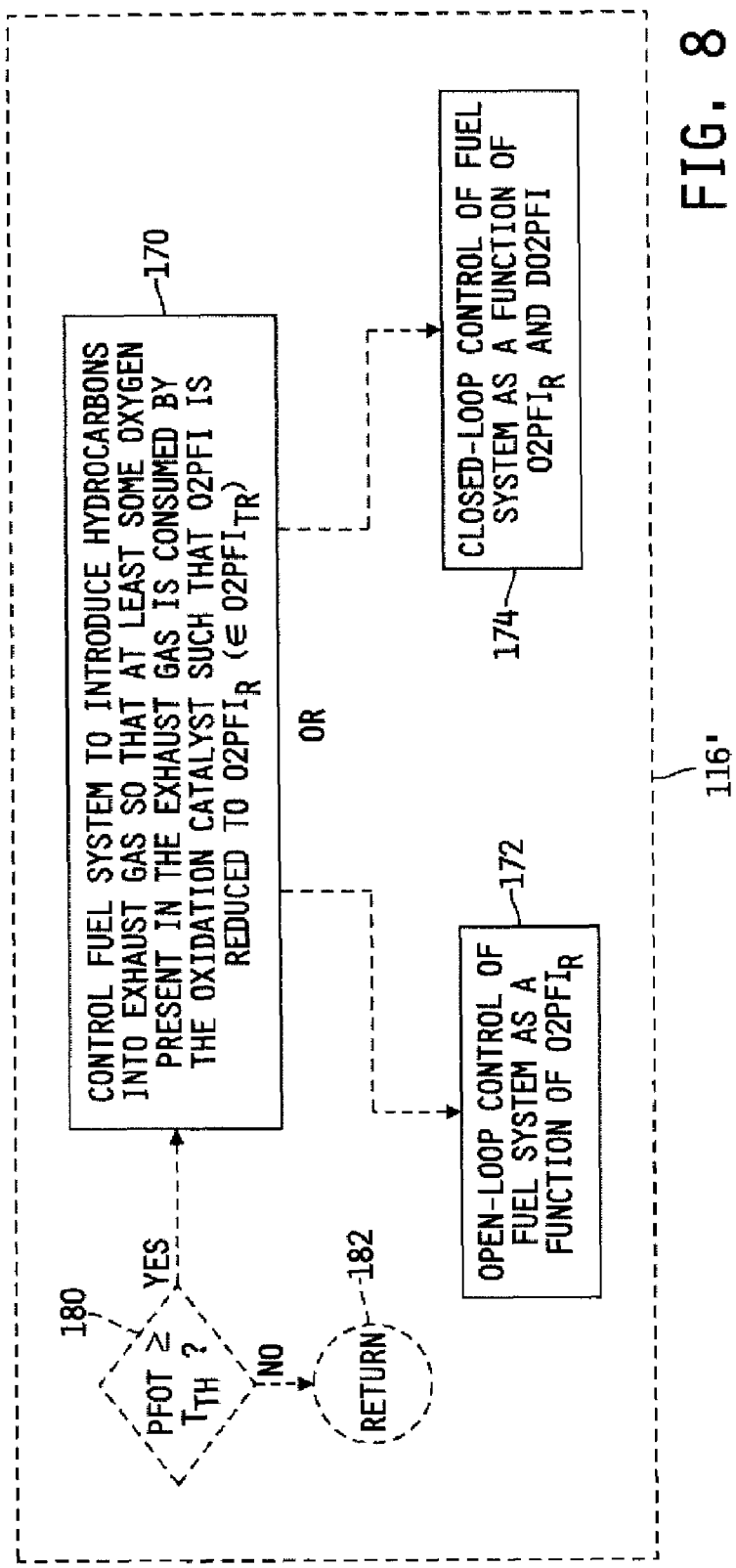

SYSTEM AND METHOD FOR INHIBITING UNCONTROLLED REGENERATION OF A PARTICULATE FILTER FOR AN INTERNAL COMBUSTION ENGINE

FIELD OF THE INVENTION

The present invention relates generally to exhaust gas aftertreatment systems for internal combustion engines, and more specifically to systems and methods for inhibiting uncontrolled regeneration of particulate filters included in such aftertreatment systems.

BACKGROUND

Exhaust gas aftertreatment systems for internal combustion engines typically include one or more aftertreatment components configured to process exhaust gas produced by the engine in a manner that removes one or more undesirable components from the exhaust gas. An example of one such aftertreatment component is a particulate filter that collects particulate matter, e.g., soot, present in the exhaust gas. Particulate filters may at times require active removal of the collected particulate matter, which is typically referred to as "active regeneration" thereof. In conventional active regeneration processes, the temperature of exhaust gas entering a particulate filter is actively increased to a temperature range sufficient to burn the collected particulate matter. It is desirable with such active regeneration processes to control peak temperatures of the particulate filter so that uncontrolled regeneration, e.g., uncontrolled burning of the particulate matter, is inhibited.

SUMMARY

The present invention may comprise one or more of the features recited in the attached claims, and/or one or more of the following features and combinations thereof. A method of inhibiting uncontrolled regeneration of a particulate filter fluidly coupled to an exhaust manifold of an internal combustion engine may comprise reducing an oxygen concentration of exhaust gas supplied to the particulate filter if active regeneration of the particulate filter is in progress and rotational speed of the engine speed thereafter drops to an idle speed range from an elevated rotational speed that is greater than the idle speed range.

Reducing an oxygen concentration of the exhaust gas supplied to the particulate filter may comprise reducing an oxygen concentration of intake air supplied to an intake manifold of the engine. Reducing an oxygen concentration of intake air supplied to an intake manifold of the engine may comprise increasing a concentration of exhaust gas in the intake air supplied to the intake manifold of the engine. An exhaust gas recirculation valve may be fluidly coupled between the exhaust manifold and the intake manifold. Increasing a concentration of exhaust gas in the intake air supplied to the intake manifold may comprise controlling the exhaust gas recirculation valve to increase the concentration of exhaust gas in the intake air supplied to the intake manifold such that the oxygen concentration of the exhaust gas supplied to the particulate filter is reduced to within a target oxygen concentration range.

Controlling the exhaust gas recirculation valve may comprise controlling a position of the exhaust gas recirculation valve relative to a reference position according to an open-loop control strategy as a function of a reduced oxygen concentration value that is within the target oxygen concentration range to reduce the oxygen concentration of the exhaust gas supplied to the particulate filter to the reduced oxygen value. Alternatively, an oxygen concentration of the exhaust gas supplied to the particulate filter may be determined, and controlling the exhaust gas recirculation valve may comprise controlling a position of the exhaust gas recirculation valve relative to a reference position according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen value.

Controlling the exhaust gas recirculation valve may alternatively comprise modulating exhaust gas flow through the exhaust gas recirculation valve to cycle the oxygen concentration of the exhaust gas supplied to the particulate filter between first and second oxygen concentration values that are within the target oxygen concentration range. Modulating the exhaust gas flow through the exhaust gas recirculation valve may comprise controlling the exhaust gas recirculation valve between first and second positions relative to a reference position according to an open-loop control strategy as a function of the first and second oxygen concentration values to cycle the oxygen concentration of the exhaust gas supplied to the particulate filter between the first and second oxygen concentration values. Alternatively, an oxygen concentration of the exhaust gas supplied to the particulate filter may be determined, and modulating the exhaust gas flow through the exhaust gas recirculation valve may comprise controlling a position of the exhaust gas recirculation valve relative to a reference position according to a closed-loop control strategy as a function of the determined oxygen concentration of the exhaust gas supplied to the particulate filter and the first and second oxygen concentration values to cycle the oxygen concentration of the exhaust gas supplied to the particulate filter between the first and second oxygen concentration values.

Alternatively or additionally, reducing an oxygen concentration of the exhaust gas supplied to the particulate filter may comprise reducing an air portion of an air-to-fuel ratio of an air-fuel mixture supplied to the engine to reduce an oxygen content of the air-fuel mixture and thereby the oxygen concentration of the exhaust gas supplied to the particulate filter. Reducing the air portion of the air-to-fuel ratio of an air-fuel mixture supplied to the engine may comprise decreasing a mass of air comprising the air-to-fuel ratio while maintaining constant fuel mass. At least one of an air intake throttle that is controllable to vary a flow rate of fresh air to an intake manifold of the engine, an exhaust throttle that is controllable to vary a flow rate of exhaust gas through the particulate filter and a number of air inlet valves associated with the engine that are each controllable by controlling lift timing thereof relative to a reference lift timing to vary a flow rate of air into a corresponding one of a number of combustion chambers of the engine may be included, and decreasing a mass of air comprising the air-to-fuel ratio may comprise controlling the at least one of an air intake throttle, an exhaust throttle and a number of air inlet valves to decrease a flow rate of the air comprising the air-to-fuel ratio such that the oxygen concentration of the exhaust gas supplied to the particulate filter is reduced to within a target oxygen concentration range.

Controlling the at least one of an air intake throttle, an exhaust throttle and a number of air inlet valves may comprise controlling a position of the at least one of the air intake throttle and an exhaust throttle relative to a reference position, or controlling lift timing of the number of air inlet valves relative to a reference lift timing, according to an open-loop control strategy as a function of a target flow rate of the exhaust gas supplied to the particulate filter to reduce the oxygen concentration of the exhaust gas supplied to the particulate filter to a reduced oxygen concentration value that is within the target oxygen concentration range.

Alternatively, an oxygen concentration of the exhaust gas supplied to the particulate filter may be determined, and controlling the at least one of an air intake throttle, an exhaust throttle and a number of air inlet valves may comprise controlling a position of the at least one of the air intake throttle and an exhaust throttle relative to a reference position, or controlling lift timing of the number of inlet valves relative to a reference lift timing, according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen concentration value.

Alternatively, controlling the at least one of an air intake throttle, an exhaust throttle and a number of air inlet valve may comprise modulating one of fresh air flow through the air intake throttle, exhaust gas flow through the exhaust throttle and lift timing of the number of air inlet valves to cycle the oxygen concentration of the exhaust gas supplied to the particulate filter between first and second oxygen concentration values that are within the target oxygen concentration range.

Modulating one of fresh air flow through the air intake throttle, exhaust gas flow through the exhaust throttle and lift timing of the number of air inlet valves may comprise modulating one of fresh air flow through the air intake throttle, exhaust gas flow through the exhaust throttle and lift timing of the number of air inlet valves according to a predetermined time-based duty cycle. Alternatively, an operating temperature of the particulate filter may be determined, and modulating one of fresh air flow through the air intake throttle, exhaust gas flow through the exhaust throttle and lift timing of the number of air inlet valves may comprise controlling the at least one of an air intake throttle, an exhaust throttle and a number of air inlet valve such that the oxygen concentration of the exhaust gas supplied to the particulate filter is reduced to the first oxygen concentration value if the operating temperature of the particulate filter is at or higher than a threshold temperature, and otherwise controlling the at least one of an air intake throttle, an exhaust throttle and a number of air inlet valve such that the oxygen concentration of the exhaust gas supplied to the particulate filter is reduced to the second oxygen concentration value, wherein the second oxygen concentration value is greater than the first oxygen concentration value.

Modulating one of fresh air flow through the air intake throttle and exhaust gas flow through the exhaust throttle may comprise controlling the at least one of an air intake throttle and an exhaust throttle between first and second positions relative to a reference position according to an open-loop control strategy as a function of first and second target flow rates of the exhaust gas supplied to the particulate filter to cycle the oxygen concentration of the exhaust gas supplied to the particulate filter between the first and second oxygen concentration values. Modulating lift timing of the number of air inlet valves may comprise varying the lift timing of the number of air inlet valves between first and second lift timing values relative to a reference timing value according to an open-loop control strategy as a function of first and second target flow rates of the exhaust gas supplied to the particulate filter to cycle the oxygen concentration of the exhaust gas supplied to the particulate filter between the first and second oxygen concentration values.

Alternatively, an oxygen concentration of the exhaust gas supplied to the particulate filter may be determined, and modulating one of fresh air flow through the air intake throttle and exhaust gas flow through the exhaust throttle may comprise controlling a position of the at least one of the air intake throttle and an exhaust throttle between first and second positions relative to a reference position according to a closed-loop control strategy as a function of the determined oxygen concentration of the exhaust gas supplied to the particulate filter and first and second target flow rates of the exhaust gas supplied to the particulate filter to cycle the oxygen concentration of the exhaust gas supplied to the particulate filter between the first and second oxygen concentration values. Modulating lift timing of the number of air inlet valves may comprise varying the lift timing of the number of air inlet valves between first and lift second timing values relative to a reference timing value according to a closed-loop control strategy as a function of the determined oxygen concentration of the exhaust gas supplied to the particulate filter and first and second target flow rates of the exhaust gas supplied to the particulate filter to cycle the oxygen concentration of the exhaust gas supplied to the particulate filter between the first and second oxygen concentration values.

Alternatively or additionally, reducing an oxygen concentration of the exhaust gas supplied to the particulate filter may comprise removing oxygen from the exhaust gas supplied to the particulate filter. Removing oxygen from the exhaust gas supplied to the particulate filter may comprise consuming at least some of the oxygen present in the exhaust gas supplied to the particulate filter. An oxidation catalyst may be fluidly coupled between the exhaust manifold and the particulate filter, and consuming at least some of the oxygen present in the exhaust gas supplied to the particulate filter may comprise introducing hydrocarbons into the exhaust gas supplied to the oxidation catalyst so that the oxidation catalyst reacts with the introduced hydrocarbons and consumes at least some of the oxygen present in the exhaust gas supplied to the particulate filter such that the oxygen concentration of the exhaust gas supplied to the particulate filter is reduced to within a target oxygen concentration range. Introducing hydrocarbons into the exhaust gas supplied to the oxidation catalyst may comprise introducing the hydrocarbons into the exhaust gas supplied to the oxidation catalyst for a predetermined time period. Alternatively, an operating temperature of the particulate filter may be determined, and introducing hydrocarbons into the exhaust gas supplied to the oxidation catalyst may comprise introducing the hydrocarbons into the exhaust gas supplied to the oxidation catalyst only if the operating temperature of the particulate filter is at or higher than a threshold temperature, and otherwise not introducing hydrocarbons into the exhaust gas supplied to the oxidation catalyst.

A fuel system may be configured to supply fuel to the engine. Introducing hydrocarbons into the exhaust gas supplied to the oxidation catalyst may comprise controlling the fuel system to inject fuel into the exhaust gas supplied to the oxidation catalyst according to an open-loop control strategy as a function of a reduced oxygen concentration value that is within the target oxygen concentration range to reduce the oxygen concentration of the exhaust gas supplied to the particulate filter to the reduced oxygen value.

Alternatively, an oxygen concentration of the exhaust gas supplied to the particulate filter may be determined, and introducing hydrocarbons into the exhaust gas supplied to the oxidation catalyst may comprise controlling the fuel system to inject fuel into the exhaust gas supplied to the oxidation catalyst according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen value.

An engine speed sensor may be configured to produce a speed signal corresponding to rotation speed of the engine. The method may further comprise processing the speed signal to determine engine rotational speed and determining that the engine speed drops to an idle speed range if the engine rotational speed drops below a speed threshold. A vehicle sensor may be configured to produce a speed signal corresponding to road speed of a vehicle carrying the engine. The method may alternatively or additionally comprise processing the speed signal to determine vehicle road speed and determining that the engine speed drops to an idle speed range if the vehicle road speed drops below a speed threshold. A mass air flow sensor may be configured to produce a flow signal corresponding to a flow rate of fresh air supplied to an intake manifold of the engine. The method may alternatively or additionally comprises processing the flow signal to determine the flow rate of fresh air supplied to the intake manifold and determining that the engine speed drops to an idle speed range if the flow rate of fresh air supplied to the intake manifold drops below a flow rate threshold.

A method of inhibiting uncontrolled regeneration of a particulate filter fluidly coupled to an exhaust manifold of an internal combustion engine may comprise determining if active regeneration of the particulate filter is in progress and rotational speed of the engine speed thereafter drops to an idle speed range from an elevated rotational speed that is greater than the idle speed range, and if so executing each, or any subcombination, of the following steps; reducing an oxygen concentration of intake air supplied to an intake manifold of the engine to thereby reduce an oxygen concentration of the exhaust gas supplied to the particulate filter, reducing an portion of an air-to-fuel ratio of an air-fuel mixture supplied to the engine to reduce an oxygen content of the air-fuel mixture and thereby the oxygen concentration of the exhaust gas supplied to the particulate filter, and removing oxygen from the exhaust gas supplied to the particulate filter.

BRIEF DESCRIPTION OF THE DRAWINGS

FIG. 8 is a flowchart of one illustrative embodiment of step 116 of the flowchart of FIG. 3.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
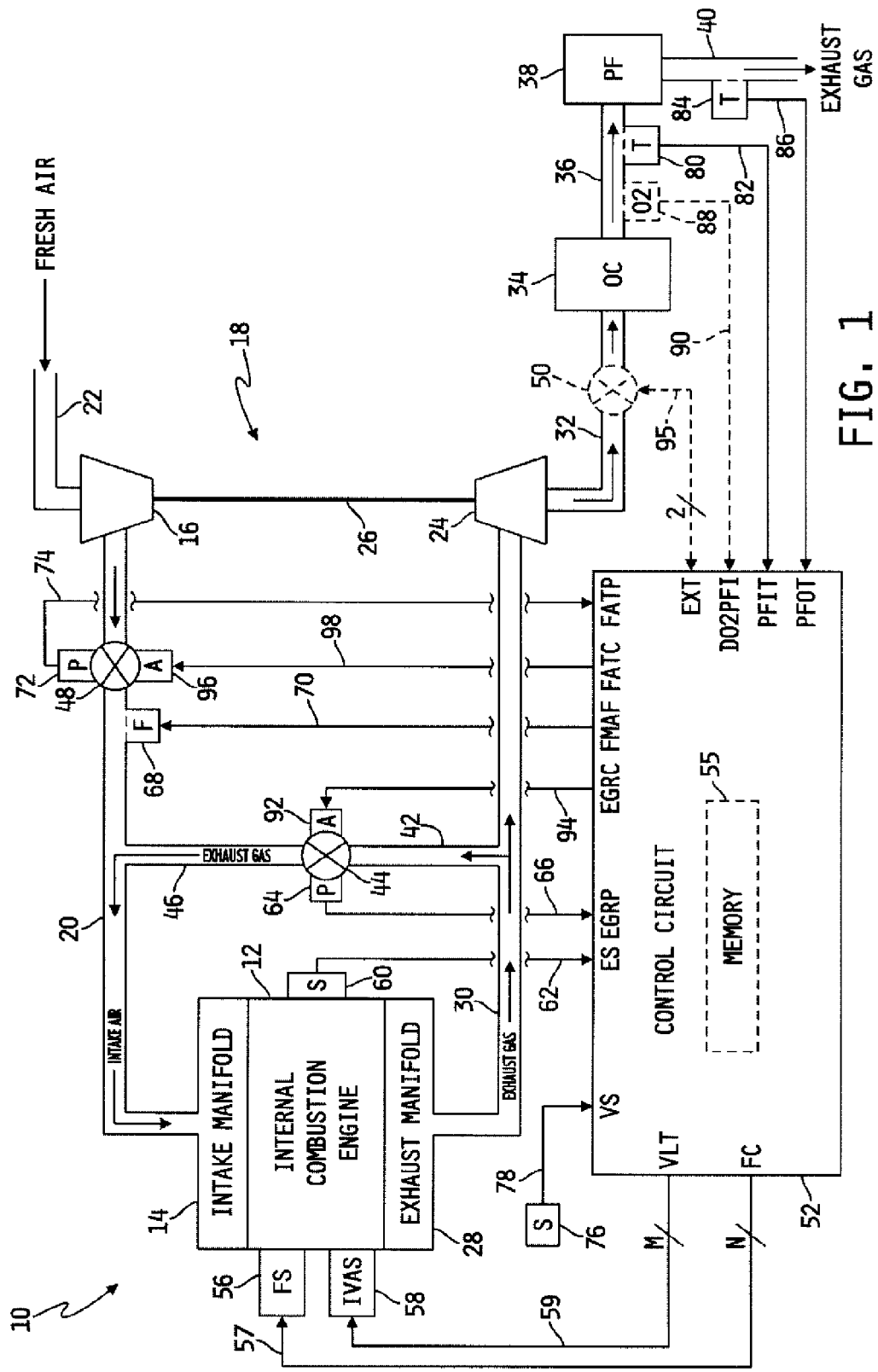
FIG. 1 is a diagrammatic illustration of one illustrative embodiment of a system for inhibiting uncontrolled regeneration of a particulate filter for an internal combustion engine.

Referring now to FIG. 1, one illustrative embodiment of a system 10 for inhibiting uncontrolled regeneration of a particulate filter for an internal combustion engine is shown. In the illustrated embodiment, the system 10 includes an internal combustion engine 12 having an intake manifold 14 fluidly coupled to a fresh air outlet of a compressor 16 of a turbocharger 18 via an air intake conduit 20. A fresh air inlet of the compressor 16 is fluidly coupled to a fresh air intake conduit 22. A turbine 24 of the turbocharger 18 is mechanically coupled via a rotational drive shaft 26 to the compressor 16 in a conventional manner. An exhaust gas inlet of the turbine 24 is fluidly coupled to an exhaust manifold 28 of the engine 12 via an exhaust gas conduit 30. An exhaust gas outlet of the turbine 24 is fluidly coupled to an exhaust gas inlet of an oxidation catalyst (OC) 34 via an exhaust gas conduit 32. The oxidation catalyst 34 includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such exhaust gas aftertreatment component 38 illustrated in FIG. 1, and in the illustrated embodiment the exhaust gas aftertreatment component 38 is a particulate filter, which is also sometimes referred to in the industry as a soot filter. The particulate filter 38 has an exhaust gas inlet that is fluidly coupled to the exhaust gas outlet of the oxidation catalyst 34 via another exhaust gas conduit 36. An exhaust gas outlet of the aftertreatment component 38 is fluidly coupled to ambient via yet another exhaust gas conduit 40. This disclosure contemplates that one or more additional exhaust gas aftertreatment components may be interposed between the oxidation catalyst 34 and the particulate filter 38, and/or between the particulate filter and ambient. For example, a conventional NOx adsorber catalyst may be interposed between the oxidation catalyst 34 and the particulate filter 38. It will be understood, however, that the presence of a conventional NOx adsorber catalyst between the oxidation catalyst 34 and the particulate filter 38 will generally not alter control of the regeneration of the particulate filter 38 as described herein.

The system 10 further includes a number of electronically controllable valves configured to control air flow to and/or from the engine 12. For example, a conventional exhaust gas recirculation (EGR) valve 44 has an exhaust gas inlet fluidly coupled to the exhaust conduit 30 via another exhaust gas conduit 42 and an exhaust gas outlet fluidly coupled to the air intake conduit 20 via another exhaust gas conduit 46. As another example, a conventional intake air throttle 48 has a fresh air inlet fluidly coupled to the fresh air outlet of the compressor 16, and a fresh air outlet fluidly coupled to the intake manifold 14. In addition to, or instead of, the intake air throttle 48, a conventional exhaust throttle 50 may be disposed in-line with one of the exhaust gas conduits, e.g., the exhaust gas conduit 32. The exhaust throttle 50 may, but need not, be included in embodiments of the system 100 that include an air intake throttle 48, and the exhaust throttle 50 is illustrated in phantom in FIG. 1 for this reason. The air intake valves associated with the number of combustion chambers of the engine 12 may further be electronically controllable to thereby control the amount of intake air supplied to the engine 12.

The EGR valve 44 is configured to be controlled in a conventional manner to control the flow of exhaust gas into the fresh air flow supplied by the compressor 16. The intake air throttle 48 and the exhaust throttle 50 are likewise configured to be controlled in a conventional manner to control the flow of fresh air into the intake manifold 14 and the flow of exhaust gas from the exhaust manifold 28 respectively. The intake air supplied to the intake manifold may thus be a mixture of fresh air that is supplied to the intake manifold 14 by the compressor 16 via the air intake throttle and recirculated exhaust gas that is supplied by the exhaust manifold 28 via the EGR valve 44 as illustrated in FIG. 1. The rate of flow of fresh air into the intake manifold 14 is determined by, among other factors, the rotational speed of the compressor 16, which may be controlled in a conventional manner via the exhaust throttle 50 and/or other conventional exhaust gas flow control mechanisms, and the position of the air intake throttle 48 relative to a reference position thereof. The rate of flow of recirculated exhaust gas to the intake manifold 14 is determined by, among other factors, the position of the EGR valve 44 relative to a reference position thereof.

The system 10 further includes a control circuit 52 configured to control the overall operation of the engine 12 as well as one or more of the associated air handling components described hereinabove. In one embodiment, the control circuit 52 is a microprocessor-based control circuit typically referred to as an electronic or engine control module (ECM), or electronic or engine control unit (ECU). It will be understood, however, that the control circuit 52 may generally be or include one or more general purpose or application specific control circuits arranged and operable as will be described hereinafter. In the illustrated embodiment, the control circuit 52 includes, or is coupled to, a memory unit 55 that stores therein a number of software algorithms executable by the control circuit 52 to control various operations of the engine 12 and associated air handling components.

The control circuit 52 includes a number of inputs receiving signals corresponding to various operating conditions of the engine 12, one or more air handling operational signals, and operating signals and/or values relating to operation of the exhaust gas aftertreatment components 34 and 38. For example, the engine 12 includes an engine speed sensor 60 electrically connected to an engine speed input (ES) of the control circuit 52 via a signal path 62. In one embodiment, the engine speed sensor 60 is a Hall-effect sensor configured to produce a speed signal on signal path 62 that corresponds to engine speed and engine position in the form of a crank angle relative to a reference crank angle; e.g., top-dead-center (TDC). Alternatively, any conventional sensor may be used; e.g., variable reluctance sensor or the like, operable to produce a signal on signal path 62 that is indicative of the rotational speed of the engine 12. In such embodiments, however, another sensor or technique will typically be required to determine engine position in the form of a crank angle relative to a reference crank angle.

The system 10 further includes an EGR valve position sensor 64 electrically connected to an EGR valve position input (EGRP) of the control circuit 52 via a signal path 66. The EGR position sensor 64 may be of conventional construction, and is configured to produce a position signal on the signal path 66 that corresponds to the position of the EGR valve 44 relative to a reference position. In one exemplary embodiment, the position signal may represent a percentage relative to a valve closed position wherein 0% represents a fully closed EGR valve 44, in which no exhaust gas passes through the EGR valve 44, and 100% represents a fully open EGR valve 44 that provides little or negligible flow restriction through the exhaust gas recirculation conduits 42 and 46.

The system 10 further includes a mass air flow sensor 68 electrically connected to a fresh mass air flow input (FMAF) of the control circuit 52 via a signal path 70. The mass air flow sensor 68 may be conventional in construction, and is configured to produce a flow signal on the signal path 70 that corresponds to the flow rate of fresh air supplied by the compressor 16 to the intake manifold 14.

The system 10 further includes an intake air throttle position sensor 72 electrically connected to a fresh air throttle position input (FATP) of the control circuit 52 via a signal path 74. The intake air throttle position sensor 72 may be of conventional construction, and is configured to produce a position signal on the signal path 74 that corresponds to the position of the intake air throttle 48 relative to a reference position. In one exemplary embodiment, the position signal produced by the sensor 72 may represent a percentage relative to a throttle closed position wherein 0% represents a fully closed intake air throttle 48, in which no fresh air passes through the intake air conduit 20, and 100% represents a fully open intake air throttle 48 that provides little or negligible flow restriction through the air intake conduit 20.

The system 10 further includes a vehicle speed sensor 76 electrically connected to a vehicle speed input (VS) of the control circuit 52 via a signal path 78. The vehicle speed sensor 76 may be conventional in construction and may be configured to produce a speed signal on the signal path 78 that corresponds to road speed of a vehicle carrying the engine 12. In on exemplary embodiment, the vehicle speed sensor may be a variable reluctance sensor suitably positioned to produce a speed signal that corresponds to the rotational speed of a tailshaft (not shown) coupled to an output of a conventional transmission (not shown). Those skilled in the art will recognize other suitable speed sensors and/or other suitable positions relative to the vehicle carrying the engine 12 from which the vehicle speed sensor 76 can produce a speed signal that corresponds to the road speed of the vehicle, and such other sensors and/or other suitable positions are contemplated by this disclosure.

The system 10 further includes a particulate filter inlet temperature sensor 80 in fluid communication with the exhaust gas conduit 36 near the exhaust gas inlet of the particulate filter 38, and electrically connected to a particulate filter inlet temperature input (PFIT) of the control circuit 52 via a signal path 82. The temperature sensor 80 may be a conventional sensor, and is configured to produce a temperature signal on signal path 82 that corresponds to the temperature of the exhaust gas supplied to the particulate filter 38.

The system 10 further includes a particulate filter outlet temperature sensor 84 in fluid communication with the exhaust gas conduit 40 near the exhaust gas outlet of the particulate filter 38, and electrically connected to a particulate filter outlet temperature input (PFOT) of the control circuit 62 via a signal path 86. The temperature sensor 84 may be a conventional sensor, and is configured to produce a temperature signal on signal path 86 that corresponds to the temperature of the exhaust gas exiting the particulate filter 38.

In the illustrated embodiment, the system 10 further includes an oxygen sensor 88 in fluid communication with the exhaust gas conduit 36 and electrically connected to a determined oxygen input (DO2PFI) of the control circuit 52 via a signal path 90. In this embodiment, the oxygen sensor 88 may be of conventional construction, and is configured to produce a signal on the signal path 90 that corresponds to the oxygen concentration of the exhaust gas supplied to the particulate filter. Alternatively, the memory unit 55 may have one or more conventional software algorithms stored therein that are executable by the control circuit 52 to estimate the oxygen concentration of the exhaust gas supplied to the particulate filter 38 as a function of a number of engine operating conditions. In this embodiment, a physical oxygen sensor is not needed, and the oxygen sensor 88 is shown in phantom in FIG. 1 for this reason.

The system 10 further includes a number of actuators and actuator systems that are responsive to control signals produced by the control circuit 52 to control corresponding operational features of the engine 12. For example, a conventional fuel system 56 is coupled to the engine 12, and is electrically connected to a fuel command output port (FC) of the control circuit 52 via a number, N, of signal paths 57, wherein N may be any positive integer. The control circuit 52 is configured to determine fuel commands as a function of a number of engine operating conditions in a conventional manner, and the fuel system is responsive to the fuel commands produced by the control circuit to supply fuel to the engine.

The system 10 further includes an intake valve actuation system 58 that is electrically connected to a valve lift timing output port (VLT) of the control circuit 52 via a number, M, of signal paths 59. The intake valve actuation system includes a number of electronically controllable hydraulic or electromechanical actuators each configured to engage and actuate an air intake valve associated with a different one of the number of cylinders or combustion chambers of the engine 12. The control circuit 52 is configured to control the lift timing of the engine intake valves according to one or more fueling algorithms stored in the memory unit 55. Engine intake valve lift timing, as this phrase is used herein, is defined as the timing, relative to a reference time, and duration that the intake valve actuator system 58 causes the various engine intake valves to lift and allow intake air supplied to the intake manifold to enter the corresponding combustion chambers of the engine.

The system 10 further includes an EGR valve actuator 92 that is electrically connected to an EGR valve control output (EGRC) of the control circuit 52 via a signal path 94. The EGR valve actuator may be of conventional construction, and is configured to be responsive to EGR control signals produced by the control circuit 52 on the signal path 94 to control the position of the EGR valve 44 relative to its reference position.

The system 10 further includes an air intake throttle actuator 96 that is electrically connected to a fresh air throttle control output (FATC) of the control circuit 52 via a signal path 98. The intake air throttle actuator 92 may be of conventional construction, and is configured to be responsive to intake air throttle control signals produced by the control circuit 52 on the signal path 98 to control the position of the intake air throttle 48 relative to its reference position. Although not specifically illustrated in FIG. 1, in embodiments of the system 12 that include the exhaust throttle 50, a conventional exhaust throttle position sensor and a conventional exhaust throttle actuator are provided, and are electrically connected to an exhaust throttle input and output (EXT) of the control circuit 52 via at least two signal paths 95. In such embodiments, the control circuit 52 is configured to determine the position of the exhaust throttle 50 relative to its reference position via position signals produced by the exhaust throttle position sensor, and to control via the exhaust throttle actuator the position of the exhaust throttle 50.

Figure 2:
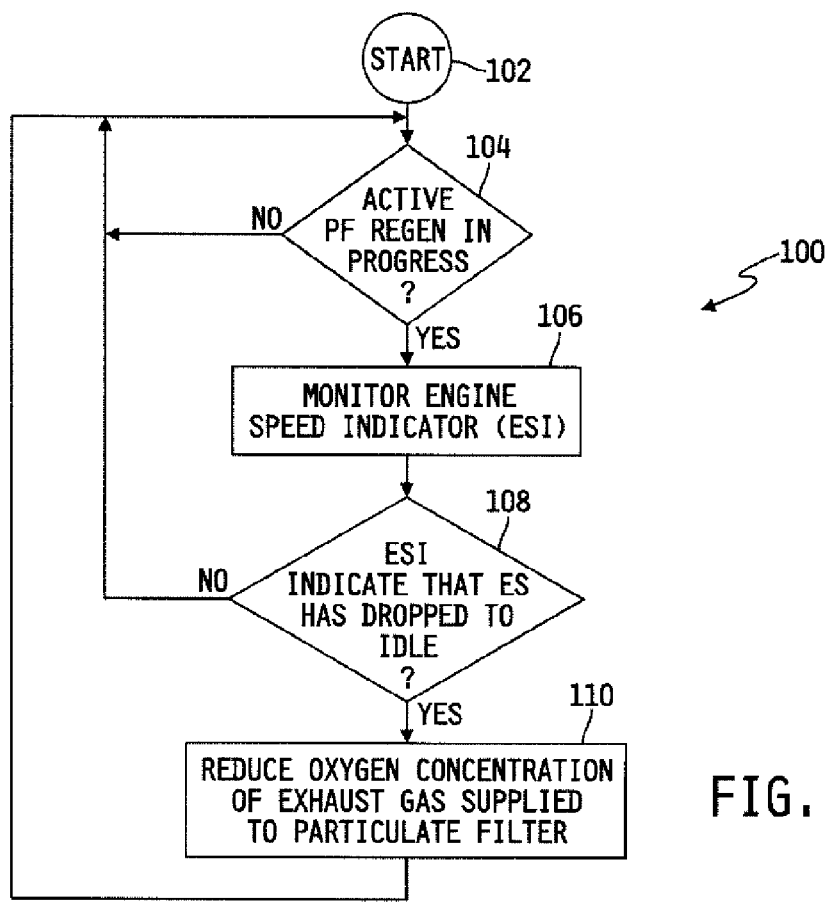
FIG. 2 is a flowchart of one illustrative embodiment of a software algorithm executable by the control circuit of FIG. 1 for inhibiting uncontrolled regeneration of the particulate filter in the system of FIG. 1.

Referring now to FIG. 2, a flowchart is shown of one illustrative embodiment of a software algorithm 100 for inhibiting uncontrolled regeneration of the particulate filter 38. The software algorithm 100 can be stored in the memory unit 55 in the form of instructions that are executable by the control circuit 52 to inhibit uncontrolled regeneration of the particulate filter. The algorithm begins at step 102, and thereafter at step 104 the control circuit 52 is operable to determine whether active regeneration of the particulate filter 38 is in progress. The memory unit 55 has one or more conventional particulate filter regeneration software algorithms stored therein that are executable by the control circuit 52 to actively or controllably regenerate the particulate filter in a known manner under specified operating conditions. In one embodiment, for example, the control circuit 52 may be operable under the direction of such one or more particulate filter regeneration software algorithms to actively or controllably regenerate the particulate filter 38 by controlling the fuel system 56 in a conventional manner to introduce hydrocarbons in the form of fuel into the exhaust gas produced by the engine 12, e.g., according to a conventional post-injection fuel control strategy. The injected hydrocarbons react with the oxidation catalyst according to a known exothermic reaction that causes the oxidation catalyst to heat the exhaust gas provided to the particulate filter to a particulate filter regeneration temperature range suitable to regenerate the particulate filter 38 by burning the particulates, or soot, trapped therein. The control circuit 52 is operable, under the direction of the one or more particulate filter regeneration software algorithms, to control the fuel system 56 in the manner just described to maintain the temperature of the exhaust gas provided to the particulate filter in the particulate filter regeneration range for a time period necessary to satisfactorily regenerate the particulate filter. It will be understood that active or controlled regeneration of the particulate filter 38 should not be limited to the example active regeneration process just described. Those skilled in the art will recognize other conventional structures and processes for actively or controllably regenerate the particulate filter, in particular alternate structures, processes and/or hydrocarbons sources for introducing hydrocarbons into the exhaust gas supplied to the particulate filer, and any such other conventional structures, processes and/or hydrocarbon sources are contemplated by this disclosure. In any case, the control circuit 52 is generally operable to maintain a regeneration value that is indicative of whether or not the particulate filter 38 is being actively or controllably regenerated. For example, the control circuit 52 may be operable to set the regeneration value to a "1" or "true" if the particulate filter 38 is being actively regenerated, and is otherwise a "0" or "false." In this example, the control circuit 52 is operable at step 104 to determine whether active regeneration of the particulate filter 38 is in progress by monitoring the state or status of the regeneration value. It will be understood that determining whether the particulate filter 38 is being actively regenerated should not be limited to the example just provided. Those skilled in the art will recognize other processes for determining whether the particulate filter 38 is being regenerated, and any such other processes are contemplated by this disclosure.

If, at step 104, the control circuit 52 determines that active regeneration of the particulate filter 38 is not in progress, execution of the algorithm repeats step 104. If the control circuit 52 otherwise determines at step 104 that active regeneration of the particulate filter 38 is in progress, algorithm execution advances to step 106 where the control circuit 52 is operable to monitor an engine speed indicator, ESI. Following step 106, the control circuit determines at step 108 whether the engine speed indicator, ESI, indicates that the engine rotational speed has dropped to an idle speed range from an elevated rotational speed that is greater than the idle speed range. This disclosure contemplates several different processes for determining whether the engine rotational speed had dropped to an idle speed range from an elevated rotational speed that is greater than the idle speed range.

In one embodiment, for example, the engine speed indicator, ESI, may be the engine speed signal, ES, produced by the engine speed sensor 60. In this embodiment, the control circuit 52 is operable to execute steps 106 and 108 by processing the engine speed signal on the signal path 62 to determine engine speed, and determining that the engine rotational speed has dropped to the idle speed range if the engine speed is less than a threshold engine speed, wherein the threshold engine speed corresponds to maximum engine speed of the idle speed range.

In another example embodiment, the engine speed indicator, ESI, may be the vehicle speed signal, VS, produced by the vehicle speed sensor 76. It is well known that in vehicle speed is related to engine speed as a function of at least the currently engaged gear ratio of a transmission coupled to the engine 12, and with transmissions that have one or more automatically engageable gear ratio the currently engaged gear ratio information is typically provided to the control circuit 52. In this embodiment, the control circuit 52 may therefore be operable to execute steps 106 and 108 to process the vehicle speed signal on the signal path 78 to determine vehicle road speed, and then to determine that the engine rotational speed has dropped to the idle speed range if the vehicle speed is less than a threshold vehicle speed, wherein the vehicle speed threshold is related to the engine speed threshold described hereinabove as a function of at least the currently engaged gear ratio. Alternatively, the control circuit 52 may be operable at step 106 to process the vehicle speed signal on the signal path 78 to compute engine speed as a function of the vehicle speed signal and at least the currently engaged gear ratio of the transmission, and to then determine that the engine speed has dropped to the idle speed range if the computed engine speed is less than the threshold engine speed.

In yet another example embodiment, the engine speed indicator, ESI, may be the fresh air mass flow signal, FMAF, produced by the mass air flow sensor 68. It is generally known that the mass flow of air supplied by the compressor 16 is proportional to the rotational speed of the engine such that if engine rotational speed drops from an elevated engine speed to an idle speed range then so too will the mass flow rate of fresh air supplied to the intake manifold 14 by the compressor 16. In this embodiment, the control circuit 52 may therefore be operable to execute steps 106 and 108 to process the fresh mass air flow signal on the signal path 70 to determine the flow rate of fresh air supplied by the compressor 16, and then to determine that the engine rotational speed has dropped to the idle speed range if the flow rate of fresh air supplied by the compressor 16 is less than a threshold flow rate, wherein the flow rate threshold is directly proportional to the engine speed threshold described hereinabove according to a know relationship between the flow rate of fresh air and the engine rotational speed. Alternatively, the control circuit 52 may be operable at step 106 to process the mass air flow signal on the signal path 70 to compute engine speed according to a know functional relationship between the two, and to then determine that the engine speed has dropped to the idle speed range if the computed engine speed is less than the threshold engine speed.

Those skilled in the art will recognize other suitable engine speed indicators and techniques for relating any such engine speed indicators to the idle speed range, and any other such engine speed indicators and techniques are contemplated by this disclosure. In any case, if the control circuit 52 determines at step 108 that the engine speed has dropped to the idle speed range, execution of the algorithm 100 loops back to step 104. If instead the control circuit 52 determines at step 108 that the engine speed has dropped from an elevated engine rotational speed to the idle speed range, algorithm execution advances to step 110 where the control circuit is operable to reduce the oxygen concentration of the exhaust gas supplied to the particulate filter 38. Follow step 110, algorithm execution loops back to step 104.

Figure 3:
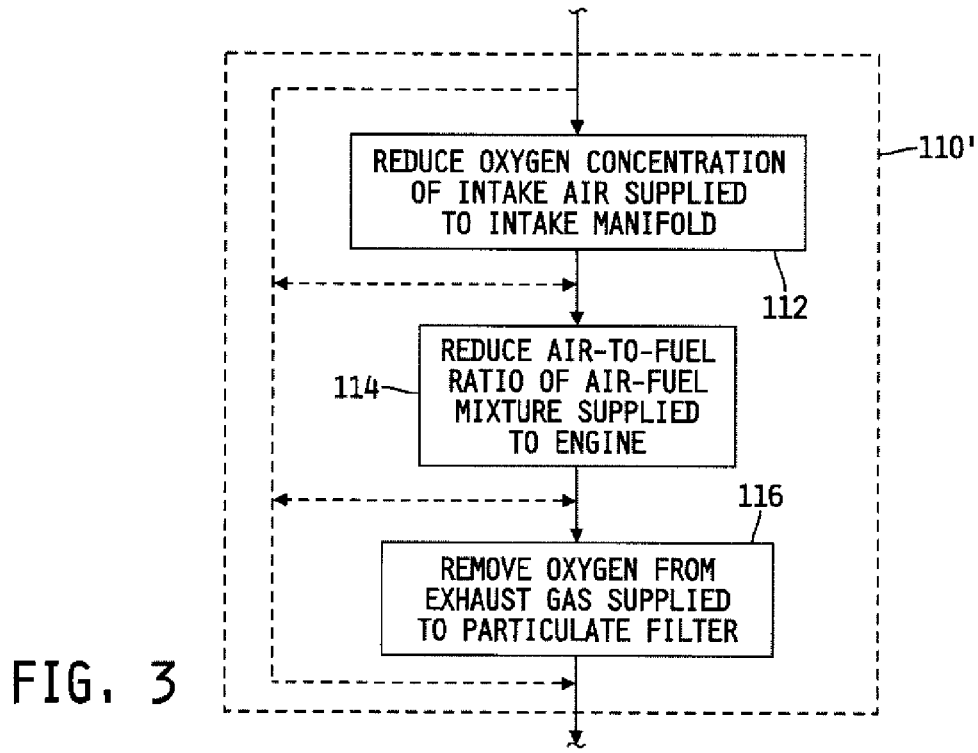
FIG. 3 is a flowchart of one illustrative embodiment of step 110 of the flowchart of FIG. 2.

Referring now to FIG. 3, a flowchart is shown of one illustrative software routine 110' for executing step 110 of the algorithm 100 of FIG. 3. The software routine 110' is stored in the memory unit 55, and comprises instructions that are executable by the control circuit 52 to reduce the oxygen concentration of the exhaust gas supplied to the particulate filter 38. In the illustrated embodiment, the software routine 110' begins at step 112 where the control circuit 52 is operable to reduce the oxygen concentration of the exhaust gas supplied to the particulate filter 38 by reducing the oxygen concentration of the intake air supplied to the intake manifold 14. By reducing the oxygen concentration of the intake air supplied to the combustion chambers of the engine 12, the exhaust gas produced by the engine 12 will likewise have reduced oxygen concentration. From step 112, the software routine 110' advances to step 114 where the control circuit 52 is operable to reduce the oxygen concentration of the exhaust gas supplied to the particulate filter 38 by reducing the air portion of the air-to-fuel ratio (A/F) of the air-fuel mixture supplied to the engine while maintaining the fuel portion of A/F constant. By reducing A/F while maintaining the fuel portion constant, a reduced amount of air will be supplied to the combustion cylinders of the engine 12 and the exhaust gas produced by the engine will likewise have reduced oxygen concentration. From step 114, the software routine 110' advances to step 116 where the control circuit 52 is operable to reduce the oxygen concentration of the exhaust gas supplied to the particulate filter 38 by removing oxygen from the exhaust gas supplied to the particulate filter 38.

While the software routine 110' of FIG. 3 was just described as including a series of three consecutive steps 112, 114 and 116, it will be understood that the software routine 110' may alternatively include only one or any combination of two of the steps 112, 114 and 116, as indicated by the dashed lines interconnecting, and routing algorithm execution around, the various steps 112, 114 and 116. The software routine 110' may thus include only step 112, only step 14, only step 116, the combination of steps 112 and 114, the combination of steps 112 and 116, the combination of steps 114 and 116, or the combination of steps 112, 114 and 116.

It should be apparent from the foregoing that the control circuit 52 is operable to reduce the oxygen concentration of the exhaust gas supplied to the particulate filter 38, if active regeneration of the particulate filter 38 is in progress and the engine speed thereafter drops to an idle speed range from an elevated rotational speed that is greater than the idle speed range, by managing the oxygen concentration or content of the air-fuel mixture supplied to the combustion chambers of the engine 12 and/or by removing oxygen directly from the exhaust gas produced by the engine 12.

Figure 4:
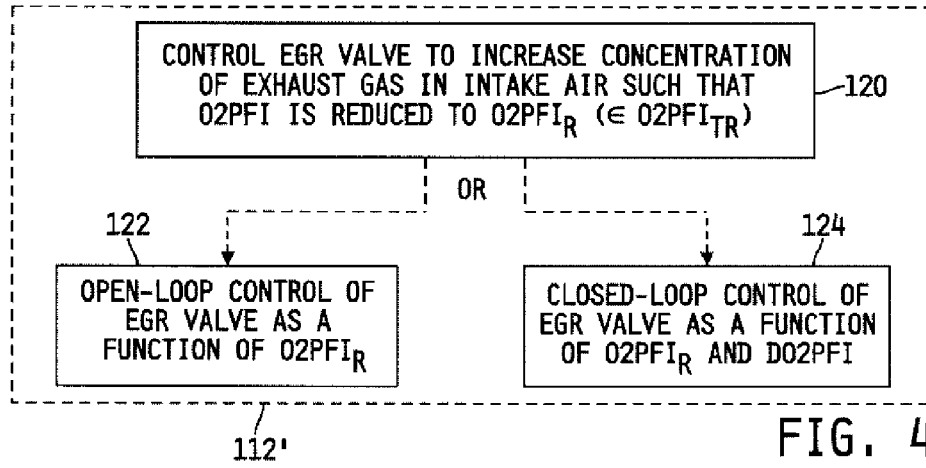
FIG. 4 is a flowchart of one illustrative embodiment of step 112 of the flowchart of FIG. 3.

Referring now to FIG. 4, a flowchart of one illustrative embodiment of a software routine 112' for executing step 112 of the software routine 110' of FIG. 3 is shown. The software routine 112' is stored in the memory unit 55, and comprises instructions that are executable by the control circuit 52 to reduce the oxygen concentration of intake air supplied to the intake manifold 14 and thus to the combustion chambers of the engine 12 by controlling a position of the EGR valve 44 relative to a reference position so as to introduce, or increase the concentration of, exhaust gas into the intake air supplied to the intake manifold of the engine. In the illustrated embodiment, the software routine 112' begins at step 120 where the control circuit 52 is operable to control the EGR valve 44, by controlling the EGR valve actuator 92 in a conventional manner via the EGRC output of the control circuit 52, to increase the concentration of exhaust gas in the intake air that is supplied to the engine 12 such that the oxygen concentration of the exhaust gas supplied to the inlet of the particulate filter 38 (O2PFI) is reduced to a reduced oxygen concentration value (O2PFI$_R$) that is within (or is an element of) a reduced oxygen concentration target range (O2PFI$_{TR}$). An example oxygen concentration target range, O2PFI$_{TR}$, may be 0-9%, although this disclosure contemplates other boundaries of the oxygen concentration target range, O2PFI$_{TR}$. The reduced oxygen concentration value, O2PFI$_R$, may be any value within the O2PFI$_{TR}$ range. In any case, the control circuit 52 is thus operable at step 112 to reduce the oxygen concentration of intake air supplied to the intake manifold 14 of the engine 12 by increasing the concentration of exhaust gas in the intake air supplied to the intake manifold 14 of the engine 12.

In one embodiment of the software routine 112', step 120 advances to step 122, as shown by the dashed line interconnecting the two steps, where the control circuit 52 is configured to control the EGR valve 44 to increase the concentration of exhaust gas in the intake air supplied to the intake manifold 14 by controlling the position of the exhaust gas recirculation valve 44 relative to a reference position, e.g., between 0% (closed) and 100% (open), according to a conventional open-loop control strategy as a function of the reduced oxygen concentration value, O2PFI$_R$, to reduce the oxygen concentration of the exhaust gas supplied to the particulate filter 38 to the reduced oxygen value O2PFI$_R$. In embodiments of the software routine 110' that include only step 112, the control circuit 52 is operable at step 122 to control the EGR valve 44 to a suitable position that reduces the oxygen concentration of the exhaust gas supplied to the particulate filter 38 to the reduced oxygen concentration value, O2PFI$_R$ under the control of only the EGR valve 44. In embodiments of the software routine 110' that additionally include either of steps 114 and/or 116, the control circuit 52 need only be operable at step 122 to control the EGR valve 44 to a position that reduces the oxygen concentration of the exhaust gas supplied to the particulate filter to a reduced oxygen concentration value that is greater than O2PFI$_R$ and that may or may not be outside of the reduced oxygen concentration target range, O2PFI$_{TR}$.

In an alternate embodiment of the software routine 112', step 120 advances to step 124, as shown by the dashed line interconnecting the two steps, where the control circuit 52 is configured to control the EGR valve 44 to increase the concentration of exhaust gas in the intake air supplied to the intake manifold 14 by controlling the position of the exhaust gas recirculation valve 44 relative to a reference position, e.g., between 0% (closed) and 100% (open), according to a conventional closed-loop control strategy as a function of the measured or otherwise determined oxygen concentration of the exhaust gas supplied to the particulate filter, DO2PFI, and of the reduced oxygen concentration value, O2PFI$_R$, to reduce the oxygen concentration of the exhaust gas supplied to the particulate filter 38 to the reduced oxygen value O2PFI$_R$. In embodiments of the software routine 110' that include only step 112, the control circuit 52 is operable at step 122 to control the EGR valve 44 to a suitable position that reduces the oxygen concentration of the exhaust gas supplied to the particulate filter 38 to the reduced oxygen concentration value, O2PFI$_R$ under the control of only the EGR valve 44. In embodiments of the software routine 110' that additionally include either of steps 114 and/or 116, the control circuit 52 need only be operable at step 122 to control the EGR valve 44 to a position that reduces the oxygen concentration of the exhaust gas supplied to the particulate filter 38 to a reduced oxygen concentration value that is greater than O2PFI$_R$ and that may or may not be outside of the reduced oxygen concentration target range, O2PFI$_{TR}$.

Figure 5:
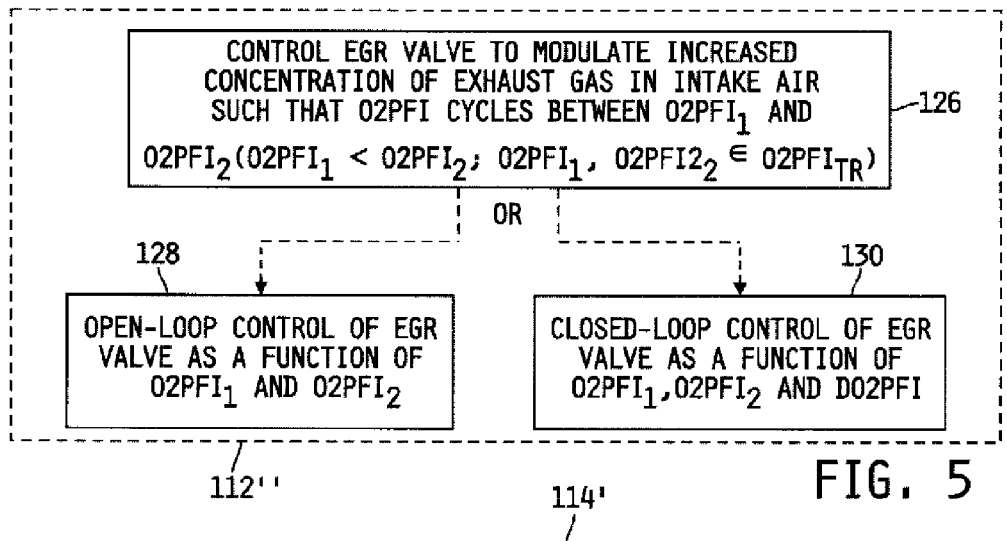
FIG. 5 is a flowchart of another illustrative embodiment of step 112 of the flowchart of FIG. 3.

Referring now to FIG. 5, a flowchart of another illustrative embodiment of another software routine 112" is shown for executing step 112 of the software routine 110' of FIG. 3. The software routine 112" is stored in the memory unit 55, and comprises instructions that are executable by the control circuit 52 to reduce the oxygen concentration of intake air supplied to the intake manifold 14 and thus to the combustion chambers of the engine 12 by controlling a position of the EGR valve 44 relative to a reference position so as to introduce, or increase the concentration of, exhaust gas into the intake air supplied to the intake manifold of the engine. In the illustrated embodiment, the software routine 112" begins at step 126 where the control circuit 52 is operable to control the EGR valve 44, by controlling the EGR valve actuator 92 in a conventional manner via the EGRC output of the control circuit 52, to modulate and increased concentration of exhaust gas in the intake air that is supplied to the engine 12 such that the oxygen concentration of the exhaust gas supplied to the inlet of the particulate filter 38 (O2PFI) cycles between two reduced oxygen concentration values, O2PFI$_1$ and O2PFI$_2$ that are both within (or are elements of) the reduced oxygen concentration target range (O2PFI$_{TR}$), and wherein O2PFI$_1$<O2PFI$_2$. Example oxygen concentration ranges for O2PFI$_1$ and O2PFI$_2$ are 0-2% and 2-9% respectively, although this disclosure contemplates other oxygen concentration ranges and/or values for O2PFI$_1$ and O2PFI$_2$. In any case, the control circuit 52 is thus operable at step 112 to reduce the oxygen concentration of intake air supplied to the intake manifold 14 of the engine 12 by modulating increased concentrations of exhaust gas in the intake air supplied to the intake manifold 14 of the engine 12 between two different exhaust concentration values. Modulating the exhaust gas concentration of the intake air supplied to the intake manifold 14 of the engine 12 in this manner allows the oxygen concentration of the exhaust gas supplied to the particulate filter 38 to be suitably reduced so that uncontrolled regeneration of the particulate filter 38 is inhibited while also maintaining active regeneration by continued burning of the particulate matter collected in the particulate filter 38.

In one embodiment of the software routine 112", step 126 advances to step 128, as shown by the dashed line interconnecting the two steps, where the control circuit 52 is configured to control the EGR valve 44 to modulate the increased concentration of exhaust gas in the intake air supplied to the intake manifold 14 by controlling the position of the exhaust gas recirculation valve 44 between first and second positions relative to a reference position, e.g., any positions between 0% (fully closed) and 100% (fully open), according to a conventional open-loop control strategy as a function of the first and second reduced oxygen concentration values, O2PFI$_1$ and O2PFI$_2$, to cycle the oxygen concentration of the exhaust gas supplied to the particulate filter 38 between the first and second reduced oxygen concentration values, O2PFI$_1$ and O2PFI$_2$. In embodiments of the software routine 110' that include only step 112, the control circuit 52 is operable at step 128 to control the EGR valve 44 to suitable first and second positions such that the oxygen concentration of the exhaust gas supplied to the particulate filter 38 is reduced to cycle between $O2PFI_1$ and $O2PFI_2$ under the control of only the EGR valve 44. In embodiments of the software routine 110' that additionally include either of steps 114 and/or 116, the control circuit 52 need only be operable at step 128 to control the EGR valve 44 to suitable first and second positions such that the oxygen concentration of the exhaust gas supplied to the particulate filter 38 cycles between first and second reduced oxygen concentration values that are greater than $O2PFI_1$ and $O2PFI_2$ respectively and that may or may not be outside of the reduced oxygen concentration target range $O2PFI_{TR}$.

In an alternate embodiment of the software routine 112'', step 126 advances to step 130, as shown by the dashed line interconnecting the two steps, where the control circuit 52 is configured to control the EGR valve 44 to modulate the increased concentration of exhaust gas in the intake air supplied to the intake manifold 14 by controlling the position of the exhaust gas recirculation valve 44 between first and second positions relative to a reference position, e.g., any positions between 0% (closed) and 100% (open), according to a conventional closed-loop control strategy as a function of the measured or otherwise determined oxygen concentration of the exhaust gas supplied to the particulate filter, DO2PFI, and of the first and second reduced oxygen concentration values, $O2PFI_1$ and $O2PFI_2$, to cycle the oxygen concentration of the exhaust gas supplied to the particulate filter 38 between the first and second reduced oxygen concentration values, $O2PFI_1$ and $O2PFI_2$. In embodiments of the software routine 110' that include only step 112, the control circuit 52 is operable at step 130 to control the EGR valve 44 to suitable first and second positions such that the oxygen concentration of the exhaust gas supplied to the particulate filter 38 is reduced to cycle between $O2PFI_1$ and $O2PFI_2$ under the control of only the EGR valve 44. In embodiments of the software routine 110' that additionally include either of steps 114 and/or 116, the control circuit 52 need only be operable at step 130 to control the EGR valve 44 to suitable first and second positions such that the oxygen concentration of the exhaust gas supplied to the particulate filter 38 cycles between first and second reduced oxygen concentration values that are greater than $O2PFI_1$ and $O2PFI_2$ respectively and that may or may not be outside of the reduced oxygen concentration target range $O2PFI_{TR}$.

Figure 6:
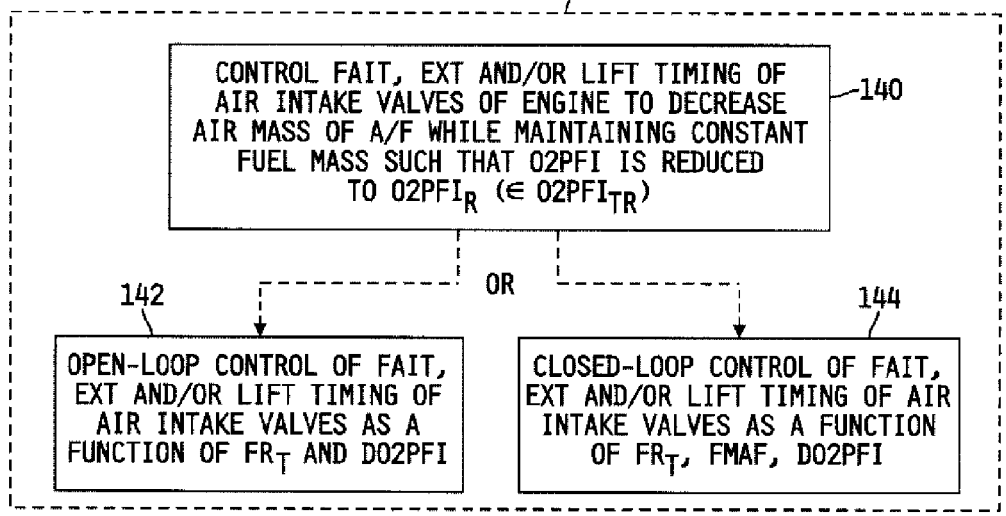
FIG. 6 is a flowchart of one illustrative embodiment of step 114 of the flowchart of FIG. 3.

Referring now to FIG. 6, a flowchart is shown of one illustrative embodiment of a software routine 114' for executing step 114 of the software routine 110' of FIG. 3. The software routine 114' is stored in the memory unit 55, and comprises instructions that are executable by the control circuit 52 to reduce the air portion of the air-to-fuel ratio of the air-fuel mixture supplied to the combustion chamber of the engine while maintaining the fuel portion of the air-to-fuel ratio constant by controlling one or more of the fresh air intake throttle 48 (FAIT), the exhaust throttle 50 (EXT), in embodiments of the system 10 that include an exhaust throttle 50, and the lift timing of the air intake valves of the engine 12, to decrease the air mass of the air-to-fuel ratio, A/F, of the air-fuel mixture supplied to the engine while maintaining the fuel mass of A/F constant. In the illustrated embodiment, the software routine 114' begins at step 140 where the control circuit 52 is operable to control one or more of the fresh air intake throttle 48 (FAIT), the exhaust throttle 50 (EXT), if included in the system 10, and the lift timing of the air intake valves of the engine 12, by controlling a corresponding one or more of the fresh air intake throttle actuator 96, the exhaust valve actuator and the intake valve actuator system 58 in a conventional manner via the FATC, EXT and VLT outputs respectively of the control circuit 52, to decrease the air mass of the air-to-fuel ratio while maintaining constant fuel mass such that the oxygen concentration of the exhaust gas supplied to the inlet of the particulate filter 38 (O2PFI) is reduced to the reduced oxygen concentration value ($O2PFI_R$) that is within (or is an element of) the reduced oxygen concentration target range ($O2PFI_{TR}$).

In one embodiment of the software routine 114', step 140 advances to step 142, as shown by the dashed line interconnecting the two steps, where the control circuit 52 is configured to control the fresh air intake throttle 48, the exhaust throttle 50 and/or the lift timing of the air intake valves of the engine 12 to decrease the mass of the air comprising the air-to-fuel ratio according to a conventional open-loop control strategy as a function of the reduced oxygen concentration value, $O2PFI_R$, to reduce the oxygen concentration of the exhaust gas supplied to the particulate filter 38 to the reduced oxygen value $O2PFI_R$. In embodiments of the software routine 110' that include only step 114, the control circuit 52 is operable at step 142 to control the fresh air intake throttle 48, the exhaust throttle 50 and/or the lift timing of the air intake valves of the engine 12 in a manner that reduces the oxygen concentration of the exhaust gas supplied to the particulate filter 38 to the reduced oxygen concentration value, $O2PFI_R$ under the control of only the air intake throttle 48, the exhaust throttle 50 and/or the lift timing of the air intake valves of the engine 12. In embodiments of the software routine 110' that additionally include either of steps 112 and/or 116, the control circuit 52 need only be operable at step 142 to control the fresh air intake throttle 48, the exhaust throttle 50 and/or the lift timing of the air intake valves of the engine 12 to a position that reduces the oxygen concentration of the exhaust gas supplied to the particulate filter to a reduced oxygen concentration value that is greater than the reduced oxygen concentration value, $O2PFI_R$ and that may or may not be outside of the reduced oxygen concentration target range $O2PFI_{TR}$.

In an alternate embodiment of the software routine 114', step 140 advances to step 144, as shown by the dashed line interconnecting the two steps, where the control circuit 52 is configured to control the fresh air intake throttle 48, the exhaust throttle 50 and/or the lift timing of the air intake valves of the engine 12 to decrease the mass of air comprising the air-to-fuel ratio according to a conventional closed-loop control strategy as a function of the reduced oxygen concentration value, $O2PFI_R$, to reduce the oxygen concentration of the exhaust gas supplied to the particulate filter 38 to the reduced oxygen value $O2PFI_R$. In embodiments of the software routine 110' that include only step 114, the control circuit 52 is operable at step 144 to control the fresh air intake throttle 48, the exhaust throttle 50 and/or the lift timing of the air intake valves of the engine 12 in a manner that reduces the oxygen concentration of the exhaust gas supplied to the particulate filter 38 to the reduced oxygen concentration value, $O2PFI_R$ under the control of only the air intake throttle 48, the exhaust throttle 50 and/or the lift timing of the air intake valves of the engine 12. In embodiments of the software routine 110' that additionally include either of steps 112 and/or 116, the control circuit 52 need only be operable at step 144 to control the fresh air intake throttle 48, the exhaust throttle 50 and/or the lift timing of the air intake valves of the engine 12 to a position that reduces the oxygen concentration of the exhaust gas supplied to the particulate filter to a reduced oxygen concentration value that is greater than $O2PFI_R$ and that may or may not be outside of the reduced oxygen concentration target range $O2PFI_{TR}$.

Figure 7:
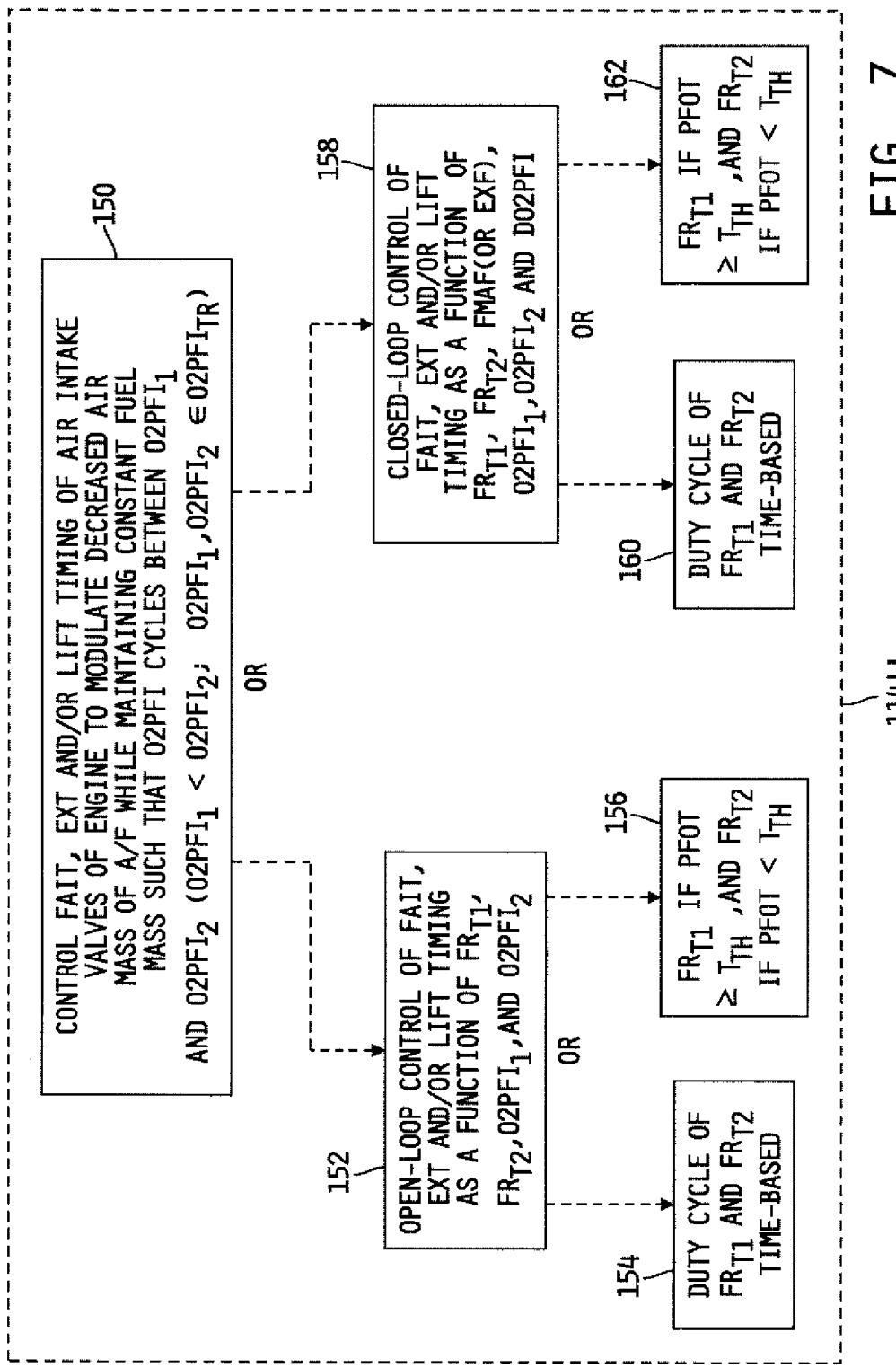
FIG. 7 is a flowchart of another illustrative embodiment of step 114 of the flowchart of FIG. 3.

Referring now to FIG. 7, a flowchart is shown of one illustrative embodiment of another software routine 114'' for executing step 114 of the software routine 110' of FIG. 3. The software routine 114" is stored in the memory unit 55, and comprises instructions that are executable by the control circuit 52 to reduce the air portion of the air-to-fuel ratio of the air-fuel mixture supplied to the combustion chamber of the engine while maintaining the fuel portion of the air-to-fuel ratio constant by controlling one or more of the fresh air intake throttle 48 (FAIT), the exhaust throttle 50 (EXT), in embodiments of the system 10 that include an exhaust throttle 50, and the lift timing of the air intake valves of the engine 12, to decrease the air mass of the air-to-fuel ratio of the air-fuel mixture supplied to the engine 12 while maintaining the fuel mass of A/F constant and to also modulate the decreased air mass of the air-to-fuel ratio, A/F, of the air-fuel mixture supplied to the engine between two different air mass values while maintaining the fuel mass of A/F constant. In the illustrated embodiment, the software routine 114' begins at step 150 where the control circuit 52 is operable to control one or more of the fresh air intake throttle 48 (FAIT), the exhaust throttle 50 (EXT), if included in the system 10, and the lift timing of the air intake valves of the engine 12, by controlling a corresponding one or more of the fresh air intake throttle actuator 96, the exhaust valve actuator and the intake valve actuator system 58 in a conventional manner via the FATC, EXT and VLT outputs respectively of the control circuit 52 between two positions (FATC and/or EXT) relative to a reference position, or between two lift timing values (VLT), to decrease the air mass of the air-to-fuel ratio while maintaining constant fuel mass and to modulate the decreased air mass of the air-to-fuel ratio while maintaining constant fuel mass such that the oxygen concentration of the exhaust gas supplied to the inlet of the particulate filter 38 (O2PFI) cycles between the two reduced oxygen concentration values, $O2PFI_1$ and $O2PFI_2$ that are both within (or are elements of) the reduced oxygen concentration target range ($O2PFI_{TR}$), and wherein $O2PFI_1 < O2PFI_2$. The control circuit 52 is thus operable at step 114 to reduce the oxygen concentration of intake air supplied to the intake manifold 14 of the engine 12 by modulating decreased air masses of the air-to-fuel ratio supplied to the intake manifold 14 of the engine 12 between two different air mass values while maintaining the fuel mass constant. Modulating the air mass of the air-to-fuel ratio of the intake air supplied to the intake manifold 14 of the engine 12 in this manner allows the oxygen concentration of the exhaust gas supplied to the particulate filter 38 to be suitably reduced so that uncontrolled regeneration of the particulate filter 38 is inhibited while also maintaining active regeneration by continued burning of the particulate matter collected in the particulate filter 38.

In one embodiment of the software routine 114", step 150 advances to step 152, as shown by the dashed line interconnecting the two steps, where the control circuit 52 is configured to control the fresh air intake throttle 48, the exhaust throttle 50 and/or the lift timing of the air intake valves of the engine 12 to modulate the mass of air comprising the air-to-fuel ratio between to air mass values by controlling the position of the fresh air intake throttle actuator 96 and/or the exhaust throttle actuator (not shown), in embodiments of the system 10 that include the exhaust throttle 50, between first and second positions relative to a reference position, and/or by controlling the lift timing of the intake air valves of the engine 12 between first and second lift timing values relative to a reference timing value, according to a conventional open-loop control strategy as a function of first and second target flow rates, $FR_{T1}$ and $FR_{T2}$, of the exhaust gas supplied to the particulate filter 38 and of the corresponding first and second oxygen concentration values, $O2PFI_1$ and $O2PFI_2$, to cycle the oxygen concentration of the exhaust gas supplied to the particulate filter 38 between the first and second oxygen concentration values $O2PFI_1$ and $O2PFI_2$. Example values of $FR_{T1}$ and $FR_{T2}$ may fall within the ranges of 0.7-2.0 lb/min and 2.1-10 lb/min respectively, although this disclosure contemplates other values and/or ranges for $FR_{T1}$ and $FR_{T2}$. In embodiments of the software routine 110' that include only step 114, the control circuit 52 is operable at step 152 to control the fresh air intake throttle 48, the exhaust throttle 50 and/or the lift timing of the air intake valves of the engine 12 in a manner that cycles the oxygen concentration of the exhaust gas supplied to the particulate filter 38 between $O2PFI_1$ and $O2PFI_2$ under the control of only the air intake throttle 48, the exhaust throttle 50 and/or the lift timing of the air intake valves of the engine 12. In embodiments of the software routine 110' that additionally include either of steps 112 and/or 116, the control circuit 52 need only be operable at step 152 to control the fresh air intake throttle 48, the exhaust throttle 50 and/or the lift timing of the air intake valves of the engine 12 in a manner that cycles the oxygen concentration of the exhaust gas supplied to the particulate filter 38 between first and second oxygen concentration values that are greater than $O2PFI_1$ and $O2PFI_2$ respectively, and that may or may not be outside of the reduced oxygen concentration target range $O2PFI_{TR}$.

In one embodiment of the software routine 114" in which the fresh air intake throttle 48, the exhaust throttle 50 and/or the lift timing of the air intake valves of the engine 12 are controlled according to an open-loop control strategy, execution of the software routine 114" may advance from step 152 to step 154, as shown by the dashed line interconnecting the two steps, where the control circuit 52 is operable to control the duty cycle of exhaust gas flow rate modulation between $FR_{T1}$ and $FR_{T2}$ in a time-based manner. Example duty cycles between $FR_{T1}$ and $FR_{T2}$ may be between 10-500 seconds at the lower exhaust gas flow rate, $FR_{T1}$, and between 5-100 seconds at the higher exhaust gas flow rate, $FR_{T2}$, although this disclosure contemplates other time-based duty cycles for $FR_{T1}$ and $FR_{T2}$.

In an alternate embodiment, execution of the software routine 114" may advance from step 152 to step 156 where the control circuit 52 is operable to control the duty cycle of exhaust gas flow rate modulation between $FR_{T1}$ and $FR_{T2}$ as a function of an operating temperature, PFOT, of the particulate filter 38. This disclosure contemplates several structures and/or techniques for determining the operating temperature, PFOT, of the particulate filter 38. In one example embodiment, the control circuit 52 may be operable to process the temperature signal produced by the particulate filter outlet temperature sensor 84 on the signal path 86 to determine the temperature of the exhaust gas exiting the particulate filter 38, and to determine the operating temperature, PFOT, of the particulate filter 38 as a the temperature of the exhaust gas exiting the particulate filter 38 after this temperature has stabilized for some time period. Alternatively, the control circuit 52 may be operable to process the temperature signal produced by the particulate filter inlet temperature sensor 80 on the signal path 82 to determine the temperature of the exhaust gas entering the particulate filter 38, and to determine the operating temperature, PFOT, of the particulate filter 38 as a the temperature of the exhaust gas entering the particulate filter 38 after this temperature has stabilized for some time period. Alternatively still, the control circuit 52 may be operable to process the temperature signal produced by the particulate filter inlet temperature sensor 80 on the signal path 82 to determine the temperature of the exhaust gas entering the particulate filter 38, to process the temperature signal produced by the particulate filter outlet temperature sensor 84 on the signal path 86 to determine the temperature of the exhaust gas exiting the particulate filter 38, and to estimate the operating temperature, PFOT, of the particulate filter 38 as a function of the temperature of the exhaust gas entering and exiting the particulate filter 38. Alternatively still, the control circuit 52 may be operable to estimate the operating temperature, PFOT, of the particulate filter 38 as a function of the temperature of the exhaust gas entering and exiting the particulate filter 38 and also of other engine and/or aftertreatment component operating parameters such as, for example, but not limited to, one or more of the mass flow rate of the intake air entering the engine 12, the mass flow rate of exhaust gas produced by the engine, the temperature of the exhaust gas exiting the engine, and the temperature of the exhaust gas exiting the turbine 24. Those skilled in the art will recognize other structures and/or techniques for determining the operating temperature, PFOT, of the particulate filter 38, and any such other structures and/or techniques are contemplated by this disclosure.

In any case, the control circuit 52 is operable at step 156 to control the time at which the exhaust gas flow rates are controlled to $FR_{T1}$ and $FR_{T2}$, as a function of the operating temperature, PFOT, of the particulate filter 38. In the illustrated embodiment, for example, the control circuit 52 may be operable to control the exhaust gas flow rate, as described hereinabove, to the lower exhaust gas flow rate, $FR_{T1}$, if the operating temperature, PFOT, of the particulate filter 38 meets or exceeds a threshold temperature, $T_{TH}$, and to control the exhaust gas flow rate, as described hereinabove, to the higher exhaust gas flow rate, $FR_{T2}$, if the operating temperature, PFOT, of the particulate filter 38 is below the threshold temperature, $T_{TH}$. One example value of the threshold temperature, $T_{TH}$, may be 500 degrees C., although other threshold temperature values are contemplated. Those skilled in the art will recognize other control strategies for controlling the exhaust gas flow rates between $FR_{T1}$ and $FR_{T2}$ as a function of the operating temperature, PFOT, of the particulate filter 38, and any such other control strategies are contemplated by this disclosure.

In another embodiment of the software routine 114", step 150 advances to step 158, as shown by the dashed line interconnecting the two steps, where the control circuit 52 is configured to control the fresh air intake throttle 48, the exhaust throttle 50 and/or the lift timing of the air intake valves of the engine 12 to modulate the mass of air comprising the air-to-fuel ratio between to air mass values by controlling the position of the fresh air intake throttle actuator 96 and/or the exhaust throttle actuator (not shown), in embodiments of the system 10 that include the exhaust throttle 50, between first and second positions relative to a reference position, and/or by controlling the lift timing of the intake air valves of the engine 12 between first and second lift timing values relative to a reference timing value, according to a conventional closed-loop control strategy as a function of the first and second target flow rates, $FR_{T1}$ and $FR_{T2}$, of the exhaust gas supplied to the particulate filter 38, the corresponding first and second oxygen concentration values, $O2PFI_1$ and $O2PFI_2$, the measured or otherwise determined value of the oxygen concentration of the exhaust gas supplied to the particulate filter 38, and the measured fresh air mass flow rate, FMAF (or the mass flow rate of the exhaust gas) to cycle the oxygen concentration of the exhaust gas supplied to the particulate filter 38 between the first and second oxygen concentration values $O2PFI_1$ and $O2PFI_2$. In embodiments of the software routine 110' that include only step 114, the control circuit 52 is operable at step 152 to control the fresh air intake throttle 48, the exhaust throttle 50 and/or the lift timing of the air intake valves of the engine 12 in a manner that cycles the oxygen concentration of the exhaust gas supplied to the particulate filter 38 between $O2PFI_1$ and $O2PFI_2$ under the control of only the air intake throttle 48, the exhaust throttle 50 and/or the lift timing of the air intake valves of the engine 12. In embodiments of the software routine 110' that additionally include either of steps 112 and/or 116, the control circuit 52 need only be operable at step 152 to control the fresh air intake throttle 48, the exhaust throttle 50 and/or the lift timing of the air intake valves of the engine 12 in a manner that cycles the oxygen concentration of the exhaust gas supplied to the particulate filter 38 between first and second oxygen concentration values that are greater than $O2PFI_1$ and $O2PFI_2$ respectively, and that may or may not be outside of the reduced oxygen concentration target range $O2PFI_{TR}$.

In one embodiment of the software routine 114" in which the fresh air intake throttle 48, the exhaust throttle 50 and/or the lift timing of the air intake valves of the engine 12 are controlled according to an closed-loop control strategy, execution of the software routine 114" may advance from step 158 to step 160, as shown by the dashed line interconnecting the two steps, where the control circuit 52 is operable to control the duty cycle of exhaust gas flow rate modulation between $FR_{T1}$ and $FR_{T2}$ in a time-based manner. Example duty cycles between $FR_{T1}$ and $FR_{T2}$ may be between 10-500 seconds at the lower exhaust gas flow rate, $FR_{T1}$, and between 5-100 seconds at the higher exhaust gas flow rate, $FR_{T2}$, although this disclosure contemplates other time-based duty cycles for $FR_{T1}$ and $FR_{T2}$.

In an alternate embodiment, execution of the software routine 114" may advance from step 158 to step 160 where the control circuit 52 is operable to control the duty cycle of exhaust gas flow rate modulation between $FR_{T1}$ and $FR_{T2}$ as a function of the operating temperature, PFOT, of the particulate filter 38, according to any one or more of the techniques described hereinabove and wherein PFOT may be determined according to one or more of the techniques described hereinabove. One example value of the threshold temperature, $T_{TH}$, may be 500 degrees C., although other threshold temperature values are contemplated.

Referring now to FIG. 8, a flowchart is shown of one illustrative embodiment of a software routine 116' for executing step 116 of the algorithm 100 of FIG. 3. The software routine 116' is stored in the memory unit 55, and comprises instructions that are executable by the control circuit 52 to remove oxygen from the exhaust gas supplied to the particulate filter 38 by controlling the fuel system 56 in a conventional manner so as to introduce hydrocarbons into the exhaust gas produced by the engine 12, thereby causing the oxidation catalyst 34 to react with the introduced hydrocarbons according to an exothermic reaction that consumes oxygen in the exhaust gas, and thereby reducing the oxygen concentration of the exhaust gas supplied to the particulate filter 38. In the illustrated embodiment, the software routine 116' begins at step 170 where the control circuit 52 is operable to control the fuel system 56 via the fueling control signals produced by the control circuit 52 on the number, N, of signal paths 57 to post-inject fuel into the combustion cylinders of the engine 12 in a conventional manner that causes hydrocarbons to be introduced into the exhaust gas produced by the engine 12 so that at least some of the oxygen present in the exhaust gas supplied to the particulate filter 38 is consumed by the oxygen catalyst 34 such that the oxygen concentration of the exhaust gas supplied to the particulate filter 38 ($O2PFI$) is reduced to a reduced oxygen concentration value ($O2PFI_R$) that is within (or is an element of) a reduced oxygen concentration target range (O2PFI$_{TR}$). The control circuit 52 is thus operable at step 112 to reduce the oxygen concentration of the exhaust gas supplied to the particulate filter 38 by controlling the timing of fuel injection into the engine in a conventional manner that causes the oxidation catalyst 34 to consume oxygen in the exhaust gas produced by the engine 12.

In one embodiment of the software routine 116', step 170 advances to step 172, as shown by the dashed line interconnecting the two steps, where the control circuit 52 is configured to control the fuel system 56 as just described according to a conventional open-loop control strategy as a function of the reduced oxygen concentration value, O2PFI$_R$, to reduce the oxygen concentration of the exhaust gas supplied to the particulate filter 38 to the reduced oxygen value O2PFI$_R$. In embodiments of the software routine 110' that include only step 116, the control circuit 52 is operable at step 172 to control the fuel system 56 as just described in a manner that reduces the oxygen concentration of the exhaust gas supplied to the particulate filter 38 to the reduced oxygen concentration value, O2PFI$_R$ under the control of only the fuel system 56. In embodiments of the software routine 110' that additionally include either of steps 112 and/or 114, the control circuit 52 need only be operable at step 172 to control the fuel system as described in a manner that reduces the oxygen concentration of the exhaust gas supplied to the particulate filter to a reduced oxygen concentration value that is greater than O2PFI$_R$ and that may or may not be outside of the reduced oxygen concentration target range, O2PFI$_{TR}$.

In an alternate embodiment of the software routine 116', step 170 advances to step 174, as shown by the dashed line interconnecting the two steps, where the control circuit 52 is configured to control the fuel system 56 as just described according to a conventional closed-loop control strategy as a function of the measured or otherwise determined oxygen concentration of the exhaust gas supplied to the particulate filter, DO2PFI, and of the reduced oxygen concentration value, O2PFI$_R$, to reduce the oxygen concentration of the exhaust gas supplied to the particulate filter 38 to the reduced oxygen value O2PFI$_R$. In embodiments of the software routine 110' that include only step 116, the control circuit 52 is operable at step 172 to control the fuel system 56 as just described in a manner that reduces the oxygen concentration of the exhaust gas supplied to the particulate filter 38 to the reduced oxygen concentration value, O2PFI$_R$ under the control of only the fuel system 56. In embodiments of the software routine 110' that additionally include either of steps 112 and/or 114, the control circuit 52 need only be operable at step 172 to control the fuel system as just described in a manner that reduces the oxygen concentration of the exhaust gas supplied to the particulate filter 38 to a reduced oxygen concentration value that is greater than O2PFI$_R$ and that may or may not be outside of the reduced oxygen concentration target range, O2PFI$_{TR}$.

In the embodiment of the software routine 116' just described, the control circuit 52 is operable to control the fuel system 56 to introduce hydrocarbons into the exhaust gas produced by the engine 12 for a predefined time period regardless of whether the control circuit 52 controls the fuel system 56 according to an open-loop or closed-loop control strategy. One example time period may be 10-500 seconds, although this disclosure contemplates other time periods during which hydrocarbons are introduced into the exhaust gas produced by the engine 12.

In an alternate embodiment of the software routine 116', the control circuit 52 may be operable to control the fuel system 56 as just described, as a function of the operating temperature, PFOT, of the particulate filter 38. The control circuit 52 may be configured to determine the operating temperature, PFOT, of the particulate filter 38 according to any one or more of the techniques described hereinabove. As illustrated by dashed-line steps 180 and 182, this alternate embodiment of the software routine 116' starts with step 180 where the control circuit 52 is operable to determine whether the operating temperature, PFOT, of the particulate filter 38 is greater than the threshold temperature, T$_{TH}$, where T$_{TH}$ may be the same as that described hereinabove with respect to FIG. 7. If, at step 180, the control circuit 52 determines that the operating temperature, PFOT, of the particulate filter 38 is at or greater than T$_{TH}$, execution of the software routine 116' advances to step 170. Otherwise, step 180 advances to step 182 where execution of the software routine 116' is returned to the algorithm 100 of FIG. 3. In this alternate embodiment of the software routine 116', the control circuit 52 is thus operable to control the fuel system 56 to post-inject fuel into the combustion cylinders of the engine to thereby introduce hydrocarbons into the exhaust gas produced by the engine 12 if the operating temperature of the particulate filter 38 meets or exceeds the threshold temperature, T$_{TH}$.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of inhibiting uncontrolled regeneration of a particulate filter fluidly coupled to an exhaust manifold of an internal combustion engine with an exhaust gas recirculation valve fluidly coupled between the exhaust manifold and an intake manifold of the engine, the method comprising reducing an oxygen concentration of exhaust gas supplied to the particulate filter if active regeneration of the particulate filter is in progress and rotational speed of the engine speed thereafter drops to an idle speed range from an elevated rotational speed that is greater than the idle speed range, wherein reducing an oxygen concentration of the exhaust gas supplied to the particulate filter comprises reducing an oxygen concentration of intake air supplied to an intake manifold of the engine, and wherein reducing an oxygen concentration of intake air supplied to an intake manifold of the engine comprises increasing a concentration of exhaust gas in the intake air supplied to the intake manifold of the engine, and wherein increasing a concentration of exhaust gas in the intake air supplied to the intake manifold comprises controlling the exhaust gas recirculation valve to increase the concentration of exhaust gas in the intake air supplied to the intake manifold such that the oxygen concentration of the exhaust gas supplied to the particulate filter is reduced to within a target oxygen concentration range, and wherein controlling the exhaust gas recirculation valve comprises modulating exhaust gas flow through the exhaust gas recirculation valve to cycle the oxygen concentration of the exhaust gas supplied to the particulate filter between first and second oxygen concentration values that are within the target oxygen concentration range.

2. The method of claim 1 wherein controlling the exhaust gas recirculation valve comprises controlling a position of the exhaust gas recirculation valve relative to a reference position according to an open-loop control strategy as a function of a reduced oxygen concentration value that is within the target oxygen concentration range to reduce the oxygen concentration of the exhaust gas supplied to the particulate filter to the reduced oxygen value.

3. The method of claim 1 further comprising determining an oxygen concentration of the exhaust gas supplied to the particulate filter,
and wherein controlling the exhaust gas recirculation valve comprises controlling a position of the exhaust gas recirculation valve relative to a reference position according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen value.

4. The method of claim 1 wherein modulating the exhaust gas flow through the exhaust gas recirculation valve comprises controlling the exhaust gas recirculation valve between first and second positions relative to a reference position according to an open-loop control strategy as a function of the first and second oxygen concentration values to cycle the oxygen concentration of the exhaust gas supplied to the particulate filter between the first and second oxygen concentration values.

5. The method of claim 1 further comprising determining an oxygen concentration of the exhaust gas supplied to the particulate filter,
and wherein modulating the exhaust gas flow through the exhaust gas recirculation valve comprises controlling a position of the exhaust gas recirculation valve relative to a reference position according to a closed-loop control strategy as a function of the determined oxygen concentration of the exhaust gas supplied to the particulate filter and the first and second oxygen concentration values to cycle the oxygen concentration of the exhaust gas supplied to the particulate filter between the first and second oxygen concentration values.

6. A method of inhibiting uncontrolled regeneration of a particulate filter fluidly coupled to an exhaust manifold of an internal combustion engine, the engine comprising at least one of an air intake throttle that is controllable to vary a flow rate of fresh air to an intake manifold of the engine, an exhaust throttle that is controllable to vary a flow rate of exhaust gas through the particulate filter and a number of air inlet valves associated with the engine that are each controllable by controlling lift timing thereof relative to a reference lift timing to vary a flow rate of air into a corresponding one of a number of combustion chambers of the engine, the method comprising reducing an oxygen concentration of exhaust gas supplied to the particulate filter if active regeneration of the particulate filter is in progress and rotational speed of the engine speed thereafter drops to an idle speed range from an elevated rotational speed that is greater than the idle speed range,
wherein reducing an oxygen concentration of the exhaust gas supplied to the particulate filter comprises reducing an air portion of an air-to-fuel ratio of an air-fuel mixture supplied to the engine to reduce an oxygen content of the air-fuel mixture and thereby the oxygen concentration of the exhaust gas supplied to the particulate filter,
and wherein reducing an air portion of an air-to-fuel ratio of an air-fuel mixture supplied to the engine comprises decreasing a mass of air comprising the air-to-fuel ratio while maintaining constant fuel mass,
and wherein decreasing a mass of air comprising the air-to-fuel ratio comprises controlling the at least one of an air intake throttle, an exhaust throttle and a number of air inlet valves to decrease a flow rate of the air comprising the air-to-fuel ratio such that the oxygen concentration of the exhaust gas supplied to the particulate filter is reduced to within a target oxygen concentration range.

7. The method of claim 6 wherein controlling the at least one of an air intake throttle, an exhaust throttle and a number of air inlet valves comprises controlling a position of the at least one of the air intake throttle and an exhaust throttle relative to a reference position, or controlling lift timing of the number of air inlet valves relative to a reference lift timing, according to an open-loop control strategy as a function of a target flow rate of the exhaust gas supplied to the particulate filter to reduce the oxygen concentration of the exhaust gas supplied to the particulate filter to a reduced oxygen concentration value that is within the target oxygen concentration range.

8. The method of claim 6 further comprising determining an oxygen concentration of the exhaust gas supplied to the particulate filter,
and wherein controlling the at least one of an air intake throttle, an exhaust throttle and a number of air inlet valves comprises controlling a position of the at least one of the air intake throttle and an exhaust throttle relative to a reference position, or controlling lift timing of the number of inlet valves relative to a reference lift timing, according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen concentration value.

9. The method of claim 6 wherein controlling the at least one of an air intake throttle, an exhaust throttle and a number of air inlet valve comprises modulating one of fresh air flow through the air intake throttle, exhaust gas flow through the exhaust throttle and lift timing of the number of air inlet valves to cycle the oxygen concentration of the exhaust gas supplied to the particulate filter between first and second oxygen concentration values that are within the target oxygen concentration range.

10. The method of claim 9 wherein modulating one of fresh air flow through the air intake throttle, exhaust gas flow through the exhaust throttle and lift timing of the number of air inlet valves comprises modulating one of fresh air flow through the air intake throttle, exhaust gas flow through the exhaust throttle and lift timing of the number of air inlet valves according to a predetermined time-based duty cycle.

11. The method of claim 9 further comprising determining an operating temperature of the particulate filter,
and wherein modulating one of fresh air flow through the air intake throttle, exhaust gas flow through the exhaust throttle and lift timing of the number of air inlet valves comprises controlling the at least one of an air intake throttle, an exhaust throttle and a number of air inlet valve such that the oxygen concentration of the exhaust gas supplied to the particulate filter is reduced to the first oxygen concentration value if the operating temperature of the particulate filter is at or higher than a threshold temperature, and otherwise controlling the at least one of an air intake throttle, an exhaust throttle and a number of air inlet valve such that the oxygen concentration of the exhaust gas supplied to the particulate filter is reduced to the second oxygen concentration value, wherein the second oxygen concentration value is greater than the first oxygen concentration value.

12. The method of claim 9 wherein modulating one of fresh air flow through the air intake throttle and exhaust gas flow through the exhaust throttle comprises controlling the at least one of an air intake throttle and an exhaust throttle between first and second positions relative to a reference position according to an open-loop control strategy as a function of first and second target flow rates of the exhaust gas supplied to the particulate filter to cycle the oxygen concentration of the exhaust gas supplied to the particulate filter between the first and second oxygen concentration values.

13. The method of claim 9 wherein modulating lift timing of the number of air inlet valves comprises varying the lift timing of the number of air inlet valves between first and second lift timing values relative to a reference timing value according to an open-loop control strategy as a function of first and second target flow rates of the exhaust gas supplied to the particulate filter to cycle the oxygen concentration of the exhaust gas supplied to the particulate filter between the first and second oxygen concentration values.

14. The method of claim 9 further comprising determining an oxygen concentration of the exhaust gas supplied to the particulate filter, and wherein modulating one of fresh air flow through the air intake throttle and exhaust gas flow through the exhaust throttle comprises controlling a position of the at least one of the air intake throttle and an exhaust throttle between first and second positions relative to a reference position according to a closed-loop control strategy as a function of the determined oxygen concentration of the exhaust gas supplied to the particulate filter and first and second target flow rates of the exhaust gas supplied to the particulate filter to cycle the oxygen concentration of the exhaust gas supplied to the particulate filter between the first and second oxygen concentration values.

15. The method of claim 9 further comprising determining an oxygen concentration of the exhaust gas supplied to the particulate filter, and wherein modulating lift timing of the number of air inlet valves comprises varying the lift timing of the number of air inlet valves between first and lift second timing values relative to a reference timing value according to a closed-loop control strategy as a function of the determined oxygen concentration of the exhaust gas supplied to the particulate filter and first and second target flow rates of the exhaust gas supplied to the particulate filter to cycle the oxygen concentration of the exhaust gas supplied to the particulate filter between the first and second oxygen concentration values.

16. The method of claim 6 further comprising an engine speed sensor configured to produce a speed signal corresponding to rotation speed of the engine, wherein the method further comprises processing the speed signal to determine engine rotational speed and determining that the engine speed drops to an idle speed range if the engine rotational speed drops below a speed threshold.

17. The method of claim 6 further comprising a vehicle sensor configured to produce a speed signal corresponding to road speed of a vehicle carrying the engine, wherein the method further comprises processing the speed signal to determine vehicle road speed and determining that the engine speed drops to an idle speed range if the vehicle road speed drops below a speed threshold.

18. The method of claim 6 further comprising a mass air flow sensor configured to produce a flow signal corresponding to a flow rate of fresh air supplied to an intake manifold of the engine, wherein the method further comprises processing the flow signal to determine the flow rate of fresh air supplied to the intake manifold and determining that the engine speed drops to an idle speed range if the flow rate of fresh air supplied to the intake manifold drops below a flow rate threshold.

19. A method of inhibiting uncontrolled regeneration of a particulate filter fluidly coupled to an exhaust manifold of an internal combustion engine with an oxidation catalyst fluidly coupled between the exhaust manifold and the particulate filter and a fuel system configured to supply fuel to the engine, the method comprising:

determining an oxygen concentration of the exhaust gas supplied to the particulate filter, and reducing an oxygen concentration of exhaust gas supplied to the particulate filter if active regeneration of the particulate filter is in progress and rotational speed of the engine speed thereafter drops to an idle speed range from an elevated rotational speed that is greater than the idle speed range, wherein reducing an oxygen concentration of the exhaust gas supplied to the particulate filter comprises removing oxygen from the exhaust gas supplied to the particulate filter, and wherein removing oxygen from the exhaust gas supplied to the particulate filter comprises consuming at least some of the oxygen present in the exhaust gas supplied to the particulate filter, and wherein consuming at least some of the oxygen present in the exhaust gas supplied to the particulate filter comprises introducing hydrocarbons into the exhaust gas supplied to the oxidation catalyst so that the oxidation catalyst reacts with the introduced hydrocarbons and consumes at least some of the oxygen present in the exhaust gas supplied to the particulate filter such that the oxygen concentration of the exhaust gas supplied to the particulate filter is reduced to within a target oxygen concentration range, and wherein introducing hydrocarbons into the exhaust as supplied to the oxidation catalyst comprises controlling the fuel system to inject fuel into the exhaust gas supplied to the oxidation catalyst according to a closed-loop control strategy as a function of the determined oxygen concentration of the exhaust gas supplied to the particulate filter and a reduced oxygen concentration value that is within the target oxygen concentration range to reduce the oxygen concentration of the exhaust gas supplied to the particulate filter to the reduced oxygen value.

20. The method of claim 19 wherein introducing hydrocarbons into the exhaust gas supplied to the oxidation catalyst comprises introducing the hydrocarbons into the exhaust gas supplied to the oxidation catalyst for a predetermined time period.

21. The method of claim 19 further comprising determining an operating temperature of the particulate filter, and wherein introducing hydrocarbons into the exhaust gas supplied to the oxidation catalyst comprises introducing the hydrocarbons into the exhaust gas supplied to the oxidation catalyst only if the operating temperature of the particulate filter is at or higher that a threshold temperature, and otherwise not introducing hydrocarbons into the exhaust gas supplied to the oxidation catalyst.

22. The method of claim 19 further comprising a fuel system configured to supply fuel to the engine, wherein introducing hydrocarbons into the exhaust gas supplied to the oxidation catalyst comprises controlling the fuel system to inject fuel into the exhaust gas supplied to the oxidation catalyst according to an open-loop control strategy as a function of a reduced oxygen concentration value that is within the target oxygen concentration range to reduce the oxygen concentration of the exhaust gas supplied to the particulate filter to the reduced oxygen value.

* * * * *